(12) United States Patent
He et al.

(10) Patent No.: US 12,369,024 B2
(45) Date of Patent: Jul. 22, 2025

(54) RESTRICTED ACCESS AND USE CONTROL FOR USER EQUIPMENT WITH REDUCED CAPABILITIES

(71) Applicant: QUALCOMM Incorporated, San Diego, CA (US)

(72) Inventors: Linhai He, San Diego, CA (US); Gavin Bernard Horn, La Jolla, CA (US); Soo Bum Lee, San Diego, CA (US); Miguel Griot, La Jolla, CA (US); Hwan Joon Kwon, San Diego, CA (US); Jing Lei, San Diego, CA (US); Peter Pui Lok Ang, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/397,645

(22) Filed: Dec. 27, 2023

(65) Prior Publication Data

US 2024/0129720 A1    Apr. 18, 2024

Related U.S. Application Data

(63) Continuation of application No. 17/220,751, filed on Apr. 1, 2021, now Pat. No. 11,895,736.
(Continued)

(51) Int. Cl.
*H04W 28/02* (2009.01)
*H04W 8/20* (2009.01)
(Continued)

(52) U.S. Cl.
CPC ............. *H04W 8/24* (2013.01); *H04W 8/20* (2013.01); *H04W 48/02* (2013.01); *H04W 76/11* (2018.02)

(58) Field of Classification Search
None
See application file for complete search history.

(56) References Cited

U.S. PATENT DOCUMENTS

2016/0219495 A1    7/2016 Martin et al.
2017/0295005 A1*   10/2017 Lee ...................... H04L 5/0053
(Continued)

FOREIGN PATENT DOCUMENTS

CA    3021658 A1    4/2019
EP    2942986 A1    11/2015

OTHER PUBLICATIONS

3GPP TR 23.743 V16.0.0 (Mar. 2019): "3rd Generation Partnership Project, Technical Specification Group Services and System Aspects, Study on Optimisations on UE Radio Capability Signalling (Release 16)", 3GPP Standard, Technical Report, 3GPP TR 23.743, 3rd Generation Partnership Project, Mobile Competence Centre, 650, Route Des Lucioles, F-06921 Sophia-Antipolis Cedex, France, No. V16.0.0, Mar. 28, 2019, XP051722959, pp. 1-56, p. 10, chapter 6.1 p. 15, chapter 6.2.4.3, Section 6.5, Whole section 6.5.3.
(Continued)

*Primary Examiner* — Gary Lafontant
(74) *Attorney, Agent, or Firm* — Guang Y. Zhang; Patterson & Sheridan LLP

(57) ABSTRACT

Certain aspects of the present disclosure provide techniques for controlling access and use of network resources and services by user equipment based on user equipment capabilities. In one aspect, a method for wireless communication by a network entity, includes: receiving, from a user equipment, a request to connect to a network, the request comprising a user equipment identifier and a reduced capability indication; determining a validity of the reduced capability indication based on at least one of: subscription data associated with the user equipment; or one or more capabilities
(Continued)

associated with the user equipment; and making a connection decision based on the validity of the reduced capability indication.

28 Claims, 11 Drawing Sheets

Related U.S. Application Data

(60) Provisional application No. 63/007,049, filed on Apr. 8, 2020.

(51) Int. Cl.
*H04W 8/24* (2009.01)
*H04W 48/02* (2009.01)
*H04W 76/11* (2018.01)

(56) References Cited

U.S. PATENT DOCUMENTS

| | | |
|---|---|---|
| 2018/0324761 A1 | 11/2018 | Velev et al. |
| 2019/0182702 A1* | 6/2019 | Wang ................ H04W 72/1268 |
| 2019/0182897 A1 | 6/2019 | Jain et al. |
| 2019/0313239 A1 | 10/2019 | Horn et al. |
| 2020/0154262 A1* | 5/2020 | Yu .......................... H04B 7/155 |
| 2021/0321249 A1 | 10/2021 | He et al. |
| 2022/0394592 A1 | 12/2022 | Chen et al. |

OTHER PUBLICATIONS

International Preliminary Report on Patentability—PCT/US2021/025516 The International Bureau of WIPO—Geneva, Switzerland, Oct. 20, 2022.
International Search Report and Written Opinion—PCT/US2021/025516—ISA/EPO—Jul. 16, 2021.

* cited by examiner

RESTRICTED ACCESS AND USE CONTROL FOR USER EQUIPMENT WITH REDUCED CAPABILITIES

CROSS-REFERENCE TO RELATED APPLICATIONS

This Application is a continuation of U.S. patent application Ser. No. 17/220,751, filed on Apr. 1, 2021, which claims the benefit of and priority to U.S. Provisional Patent Application No. 63/007,049, filed on Apr. 8, 2020, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for controlling access and use of network resources and services by user equipment based on user equipment capabilities.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved a network's control of access and use of its services for user equipment of varying capability.

Aspects provide a method for wireless communication by a network entity, includes: receiving, from a user equipment, a request to connect to a network, the request comprising a user equipment identifier and a reduced capability indication; determining a validity of the reduced capability indication based on at least one of: subscription data associated with the user equipment; or one or more capabilities associated with the user equipment; and making a connection decision based on the validity of the reduced capability indication.

Another aspect provides a method for wireless communication by a network entity, including: receiving from a user equipment a request to connect to a network, wherein the request comprises a user equipment identifier; retrieving subscription data associated with the user equipment based on the user equipment identifier; initiating a capability match procedure with the user equipment; determining one or more capabilities of the user equipment based on the capability match procedure; and comparing the one or more capabilities to subscription data to determine an outcome of the capability match procedure, making a connection decision based on the outcome of the capability match procedure.

Another aspect provides a method for performing wireless communications, including: transmitting to a network entity a request to connect to the network comprising a user equipment identifier and a reduced capability indication; receiving from the network entity a capability inquiry; transmitting to the network entity one or more user equipment capabilities; and receiving a connection decision from the network entity.

Further aspects provide non-transitory computer readable media comprising instructions that, when executed by one or more processors of a processing system, cause the processing system to perform the aforementioned methods as well as those further described herein.

Further aspects provide a computer program product embodied on a computer readable storage medium comprising code for performing the aforementioned methods as well as those further described herein.

Further aspects provide a processing system comprising means for performing the aforementioned methods as well as those further described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
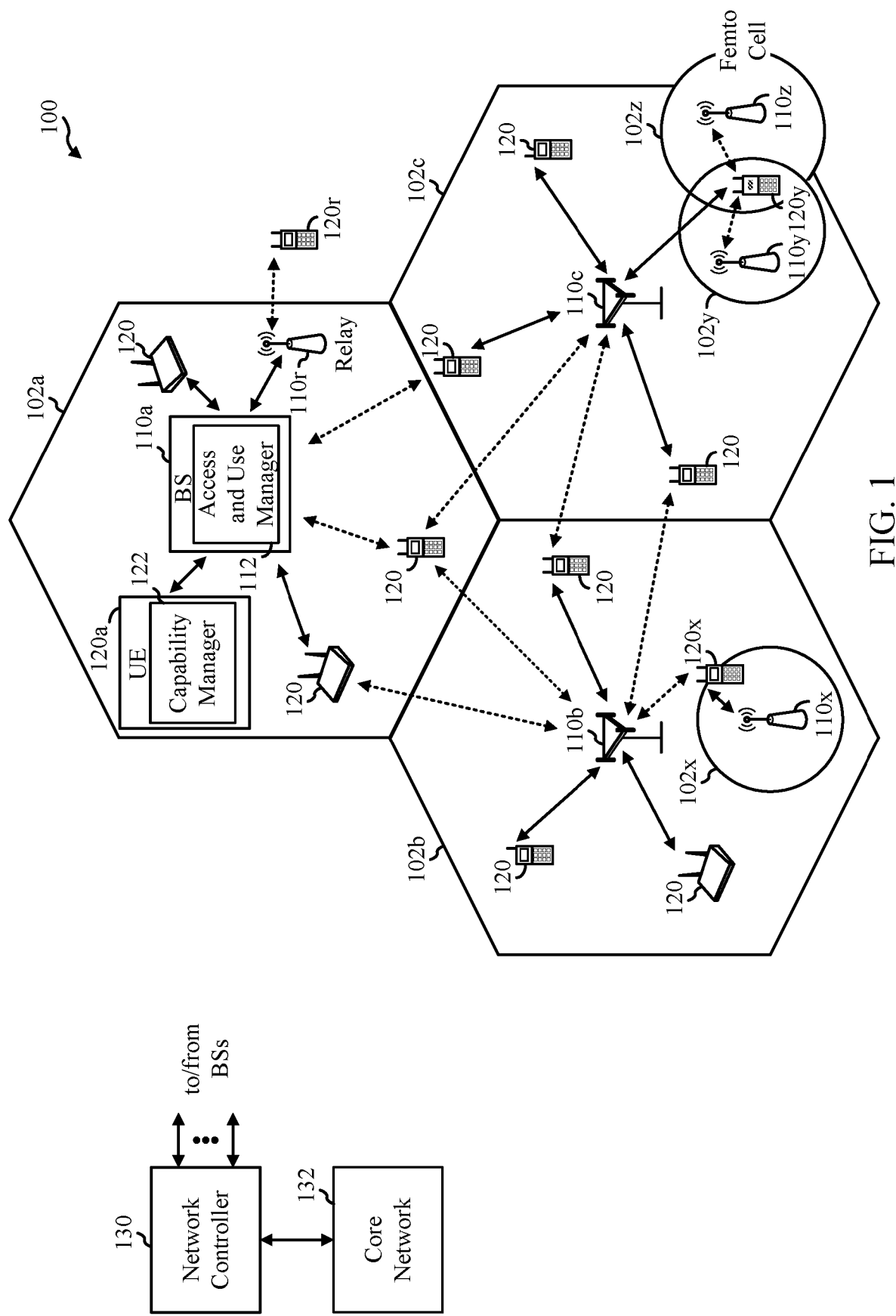
FIG. 1 is a block diagram conceptually illustrating an example wireless communication network.

Aspects of the present disclosure provide apparatus, methods, processing systems, and computer-readable mediums for controlling access and use of network resources and services by user equipment based on user equipment capabilities.

The following description provides examples of controlling access and use of network resources and services by user equipment based on user equipment capabilities in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. In some cases, each frequency may support a single RAT in a given geographic area in order to avoid interference between wireless networks of different RATs.

The techniques described herein may be used for various wireless networks and radio access technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmWave) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR further supports beamforming, and beam direction may be dynamically configured. MIMO transmissions with precoding may also be supported in NR. For example, MIMO configurations in the DL may support up to 8 transmit antennas with multi-layer DL transmissions up to 8 streams and up to 2 streams per UE. Further, multi-layer transmissions with up to 2 streams per UE may be supported in NR. Further yet, aggregation of multiple cells may be supported with up to 8 serving cells in NR.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipments (UEs) 120 in the wireless communication network 100 via one or more interfaces.

According to certain aspects, the BSs 110 and UEs 120 may be configured for verifying capabilities of UEs 120 and controlling network access and use based on those capabilities. As shown in FIG. 1, the BS 110a includes an access and use manager 112 that is configured to verify a UE's capabilities and control network access and use accordingly, in accordance with aspects of the present disclosure, such as those described below with respect to FIGS. 5A, 5B, 6, and 7. The UE 120a includes a capability manager 122 that is configured to identify its capabilities to network 100 so that network 100 may control access and use of network resources, in accordance with aspects of the present disclosure, such as those described below with respect to FIGS. 5A, 5B, and 8.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110.

In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may generally support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for those BSs 110 (e.g., via a backhaul). In some aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc., as described further below with respect to FIG. 4.

Figure 2:
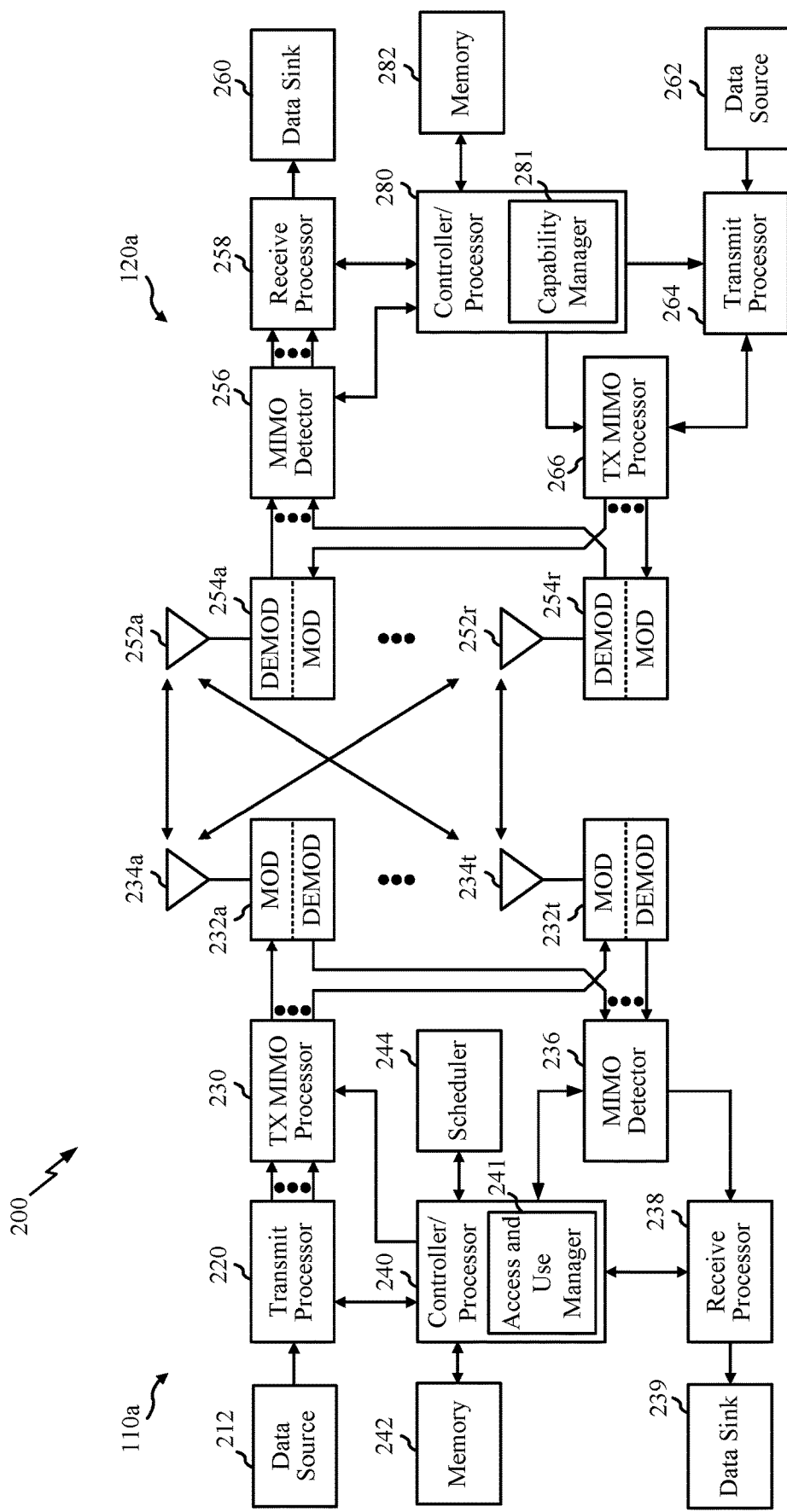
FIG. 2 is a block diagram conceptually illustrating a design of an example a base station and user equipment.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH) or others.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols to other aspects of UE 120a. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an access and use manager 241 that is configured to verify a UE's capabilities and control network access and use accordingly, according to aspects described herein, such as those described below with respect to FIGS. 5A, 5B, 6, and 7. As shown in FIG. 2, the controller/processor 280 of the UE 120a has a capability manager 281 that to identify its capabilities to the network (e.g., by way of BS 110a), according to aspects described herein, such as those described below with respect to FIGS. 5A, 5B, and 8. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
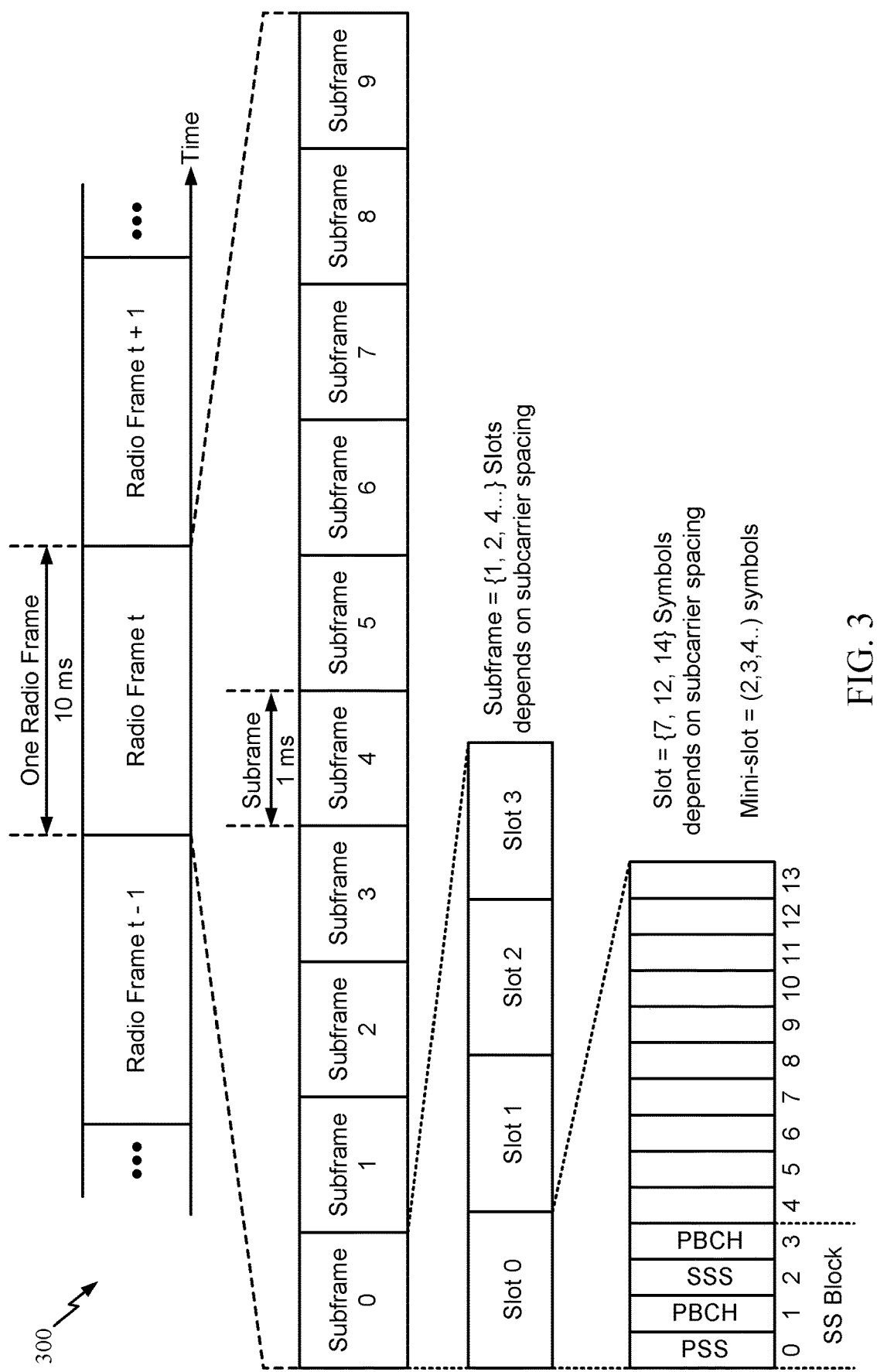
FIG. 3 is an example frame format for certain wireless communication systems.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In NR, protocol and reference points are defined for each Network Function (NF). By way of comparison, in 4G core networks, e.g., evolved packet core (EPC) networks, protocol and reference points are defined for each entity, such as a mobility management entity (MME), serving gateway (S-GW), and packet data network gateway (P-GW).

Figure 4:
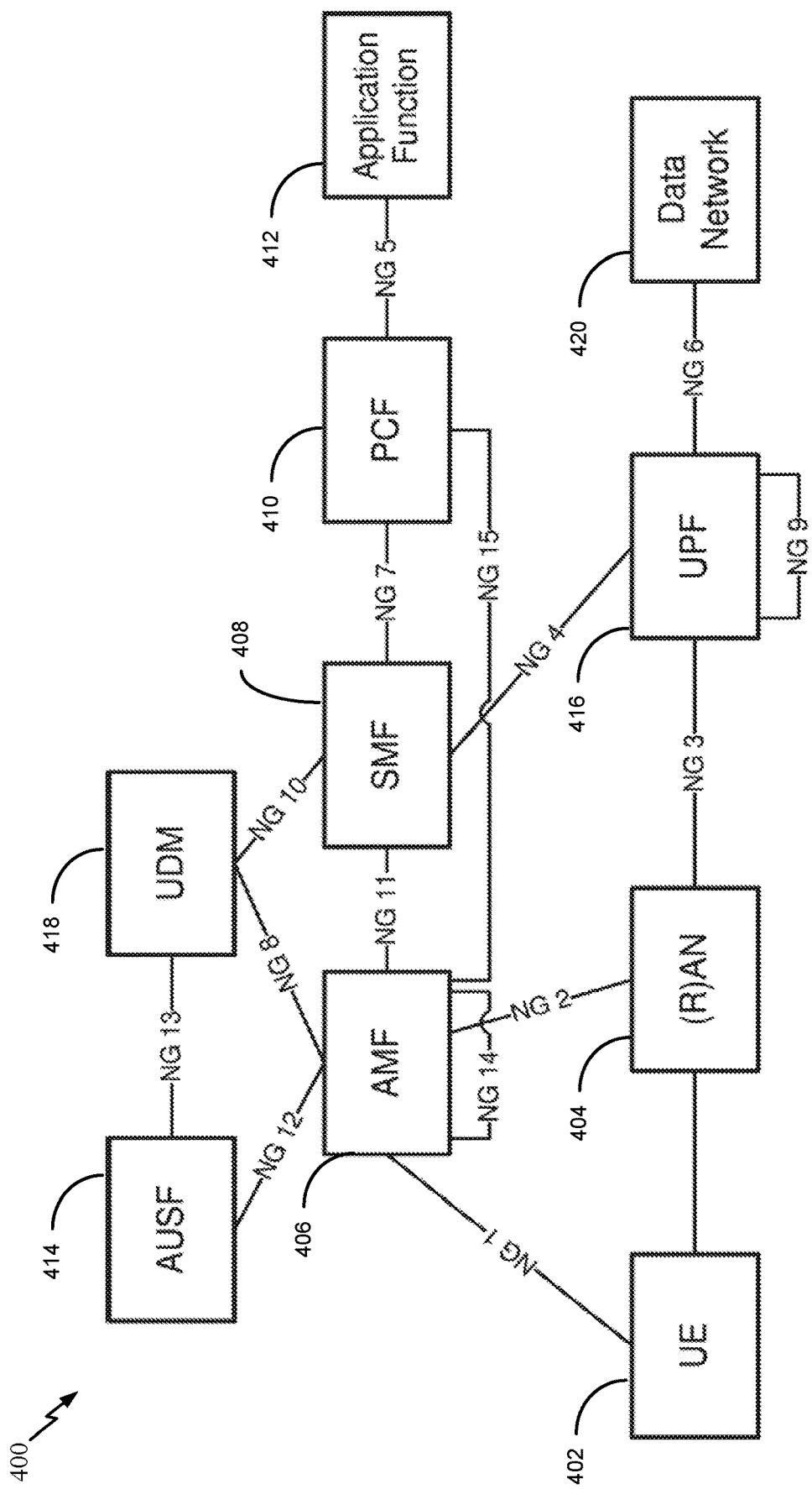
FIG. 4 depicts an example architecture for a NR core network.

FIG. 4 depicts an example architecture for a NR core network 400, composed of various example NFs and connections between NFs.

In the depicted example, a UE 402 is connected to either a radio access network (RAN) or an access network (AN) 404 as well as access and mobility function (AMF) 406. In some aspects, the RAN represents a base station using new radio access technologies, such as NR, and other technologies concurrently, such as evolved LTE, while the AN may include a general base station including non-3GPP access, such as Wi-Fi.

In the example depicted in FIG. 4, the NR core network 400 (e.g., a 5GC network) consists of various NFs, including AMF 406, session management function (SMF) 408, policy control function (PCF) 410, application function (AF) 412, authentication server function (AUSF) 414, user plane function (UPF) 416, and user data management (UDM) 418.

In some aspects, AMF 406 provides UE-based authentication, authorization, mobility management, and related function. For example, a UE (e.g., UE 402) using multiple access technologies may nevertheless be connected to a single AMF because the AMF is independent of the access technologies.

In some aspects, SMF 408 is responsible for session management and allocates IP addresses to UEs, such as UE 402. It also selects and controls the UPF (e.g., 416) for data transfer. If a UE has multiple sessions, different SMFs may be allocated to each session to manage them individually and possibly provide different functionalities per session.

In some aspects, AF 412 provides information on the packet flow to PCF 410, which is responsible for policy control in order to support Quality of Service (QoS). Based on the information, PCF 410 determines policies about mobility and session management to make AMF 406 and SMF 408 operate properly.

In some aspects, AUSF 414 stores data for authentication of UEs (e.g., 402) while UDM 418 stores subscription data for a UE (e.g., 402).

Subscription data for a UE may be part of a subscription profile associated with a subscriber (user) and may generally contain information about services that are applicable to the subscriber and/or the subscriber's UE. For example, subscription data may include: one or more categories associated with the subscriber and/or the subscriber's UE; a list of allowed services for the subscriber and/or the subscriber's UE; information on the subscriber's and/or the subscriber UE's allowed QoS; subscription pricing information; location information relevant for service pricing; information related to the subscriber's and/or the subscriber UE's usage monitoring; priority levels for various multimedia services; subscriber spending limits; a list of application service providers and their applications; and others.

Subscription data may be used by NFs of network 400 to perform policy control based on the services that an operator of network 400 provides to its subscribers (e.g., end-users), and may vary by operator based on individual operator's business models and business offerings.

In some aspects, data network 420 is not part a part of the NR core network, but is provides various services to the core network, such as Internet access or operator services.

NR core networks, such as 400, may be configured to separate the user plane and the control plane. The user plane may generally carry user traffic and the control plane may generally carry signaling in network 400. In FIG. 4, UPF 416 is in the user plane while other NFs, such as AMF 406, SMF 408, PCF 410, AF 412, AUSF 414, and UDM 418, are in the control plane. Separating the user and control planes beneficially allows each NF to be scaled independently, and also allows UPFs (e.g., 416) to be deployed separately from control plane functions in a distributed fashion. For example, UPFs (e.g., 416) may be deployed very close to UEs (e.g., 402) to shorten the round trip time between UEs (e.g., 402) and a data network (e.g., 420) for applications requiring low latency.

Generally, each NF in FIG. 4 may be configured to interact with another NF directly, though intermediate functions may be used to route messages from one NF to another NF. In the control plane, a set of interactions between two NFs may be defined as service so that its reuse is possible. The user plane supports interactions such as forwarding operations between different UPFs.

Supporting Reduced Capability User Equipment in Networks

As networks are becoming more capable and data services more diversified, there is a need to further segment and control UE interactions with data networks based on UE capabilities.

For example, a segment (or category) of reduced capability NR UEs (e.g., as compared with regular NR UEs) may have fewer antennas, narrower bandwidth, and longer processing timelines, and, as a result, may consume more radio resources than full capability NR UEs, such as requiring transmission repetition to ensure network coverage. As a consequence, network providers need to control access of network resources by reduced capability UEs to ensure overall network performance.

UE capabilities may be associated with or part of a network subscriber's profile data, which may include subscription data defining network accesses and services available to the subscriber. In some cases, UE capability categories, including specific categories for reduced capability UEs, may be defined in network interoperability standards, such as those maintained by 3GPP. Such categories can be based on various factors, such as expected use case (e.g. wearables, camera, sensors, IoT, etc.), as well as based on UE's radio capabilities (e.g. high performance, mid-tier, low cost, etc.), and combinations of both. In some cases, network operators may adopt all or some subset of the categories defined by standards, or define their own UE categories based on operational needs specific to their network environments and users. Notably, these are just a few examples, and many others are possible.

Unfortunately, various problems may arise when UEs of varying capability interact with a network without an ability to verify the UEs' capabilities.

For example, a misconfigured reduced capability UE may attempt to access network resources and services reserved for full capability UEs, which wastes finite network resources (e.g., air time) to the detriment of other UEs interacting with the network. As another example, an intentionally misconfigured (or hacked) UE may masquerade as a reduced capability UE in order to misappropriate a lower tier subscription plan while nevertheless consuming higher level services of the network reserved for higher tier subscription plans. Thus, techniques are needed for verifying UE capabilities and controlling access to network services based on those capabilities.

Described herein are various network control techniques that beneficially support network interoperability with UEs of varying capability (e.g., full capability and reduced capability NR UEs). The techniques described herein provide for matching capabilities between network resources and UE capabilities, restricting network uses based on UE capabilities (e.g., based on a defined set of devices with similar capabilities), and restricting access to network resources based on UE capabilities. In some aspects, as described further below, matching capabilities may be implemented on the network side by confirming a UE's capabilities match its subscription, and on the UE side by confirming that the network supports the UE's capabilities. Once matched, a UE's verified capabilities may then be used to control access to the network in general, and to control uses of the network more specifically.

Accordingly, the techniques described herein improve conventional network access and control schemes, which either do not account for UE capabilities, or rely solely on an indication of UE capabilities without verification to control access and use. The improvement leads to more efficient use of the finite resources of a radio access network, which in-turns provides for better network availability and faster data interchange with the network, among other benefits.

Figure 5A:
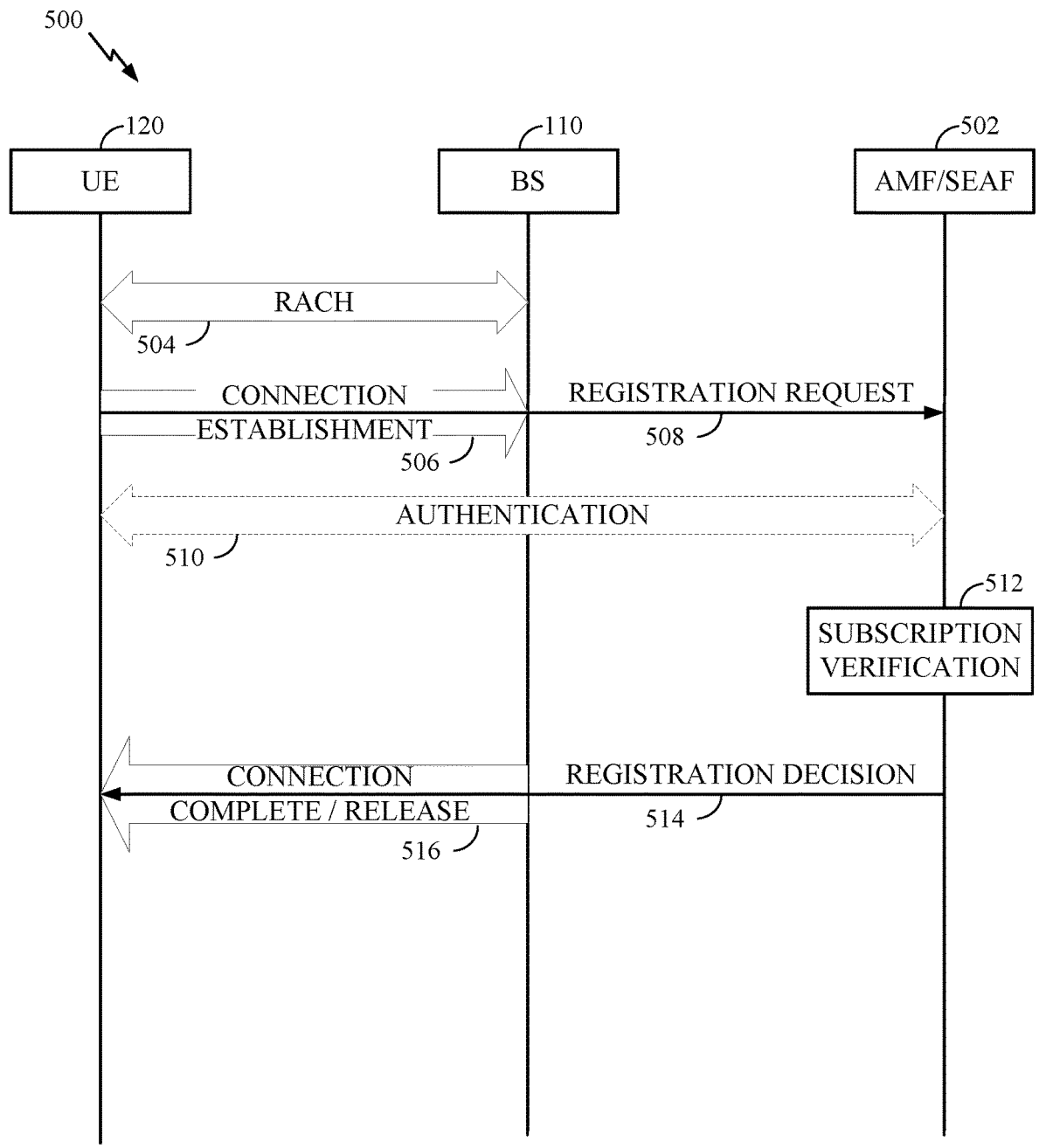
FIGS. 5A and 5B are flow diagram illustrating example operations for wireless communication.
Figure 5B:
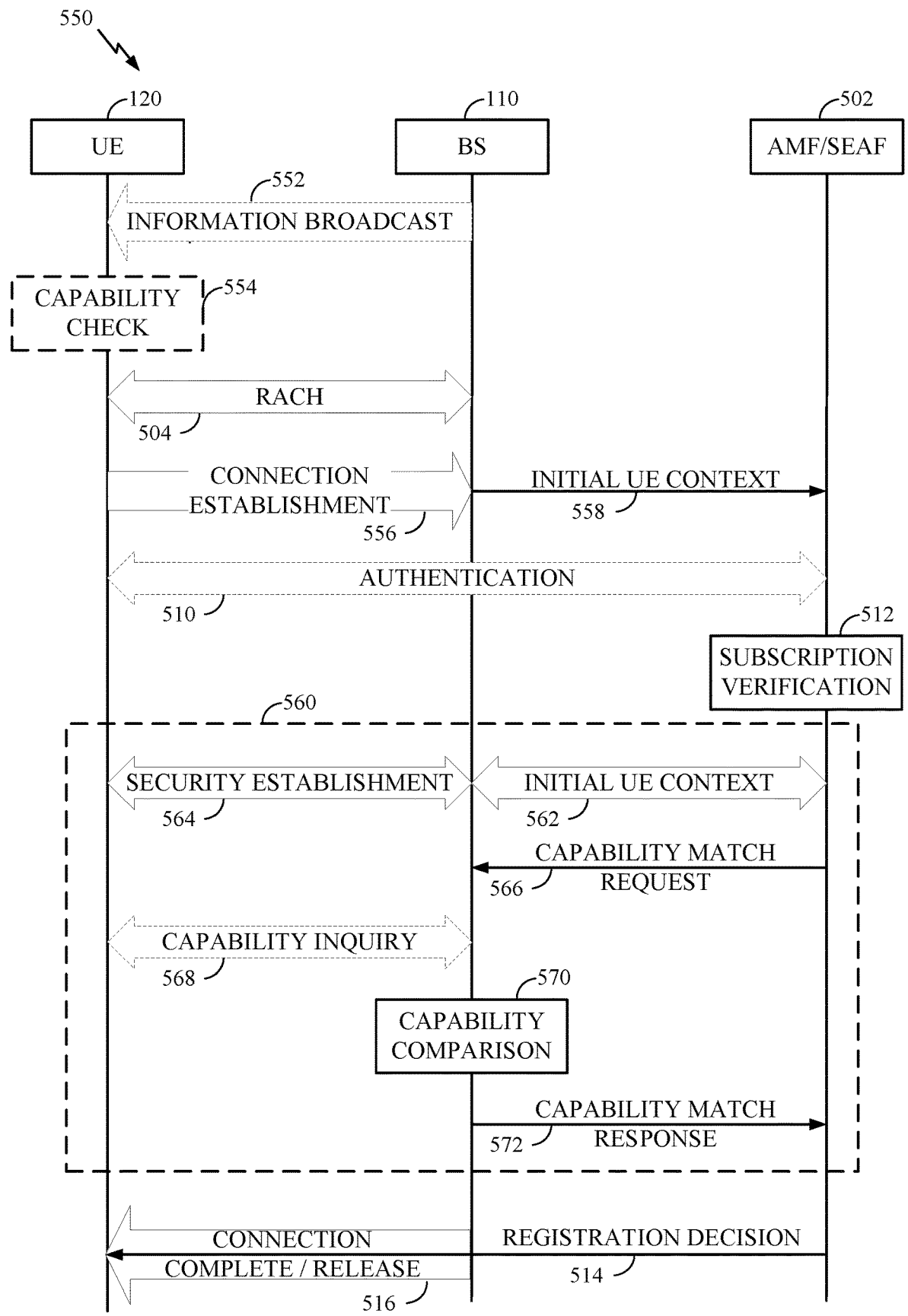

Example Flows for Controlling Access and Use of Network Resources Based on UE Capabilities FIGS. 5A and 5B are flow diagram illustrating example operations 500 and 550, respectively, for wireless communication, in accordance with certain aspects of the present disclosure.

In some aspects, various operations 500 and 550 may be performed between a UE, such as UE 120a in FIGS. 1 and 2, and a base station, such as BS 110a in wireless communication network 100 in FIGS. 1 and 2.

In some aspects, operations performed by UE 120 may be implemented as software components that are executed and run on one or more processors (e.g., controller/processor 280 of FIG. 2). Further, the transmission and reception of signals by the UE for various operations 500 and 550 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

In some aspects, operations performed by BS 110 may be complimentary to the operations performed by the UE, and may be implemented as software components that are executed and run on one or more processors (e.g., controller/processor 240 of FIG. 2). Further, the transmission and reception of signals by BS 110 in operations 500 and 550 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

In FIGS. 5A and 5B, large arrows (e.g., 506) generally represent a group of signaling messages within a procedure conducted between a UE and a network element, such as BS 110 and AMF 502, and thin arrows (e.g., 510) represent a single message between a UE and a network element.

Turing to FIG. 5A specifically, operations 500 begin at operation 504 with UE 120 initiating a session with BS 110 (e.g., a gNodeB) using a random-access channel (RACH) procedure. In some aspects, BS 110 may be an example of a R(AN) 404 (e.g., a access network entity) as in FIG. 4.

Operations 500 then proceed to operation 506 where UE 120 commences a connection establishment procedure with BS 110, such as an RRC connection procedure. During connection establishment, UE 120 transmits a registration request message to access management function (AMF) (or, alternatively, security anchor function (SEAF)) 502 via a direct non-access stratum (NAS) message in operation 508.

In some aspects, the registration request message at operation 508 includes a UE ID (e.g., a subscription concealed identifier (SUCI) or serving temporary mobile subscriber identity (S-TMSI)) and a reduced capability indication. In some aspects, the reduced capability indication may include information regarding UE 120, such as physical capabilities (e.g., number of antennas), functional capabilities (e.g., operating bandwidth), and other capabilities Operations 500 may then optionally proceed to 510 where UE 120 commences an authentication procedure with AMF/SEAF 502.

Generally, there are various cases for registration, such as an initial registration, a mobility registration update, and a periodic registration update. In the case of an initial registration, a UE provides may provide its SUCI in the registration request (as in the step above), which triggers authentication. In the case of mobility or periodic registration updates, the UE may provide an S-TMSI and authentication may not be required. However, the network (e.g., AMF) may decide to run authentication in certain scenarios anyway, such as when the AMF cannot locate the UE (security) context, or when the AMF decides to run a fresh authentication because the UE is registered for a long while without authentication. Thus, operation 510 may be required for certain scenarios and optional for others.

Operations 500 then proceed to operation 512 with verifying the UE's reduced capability indication (provided in operation 508) against its subscription data to determine a validity of the UE's reduced capability indication. In some aspects, the subscription data associated with UE 120 may be retrieved from another network function, such as UDM 418 in FIG. 4, based on the UE ID provided in operation 508.

For example, allowable, required, or maximum capabilities defined in the subscription data may be compared against the capabilities provided by UE 120 in the reduced capability indication. If the reduced capability indication information is consistent with the subscription, the subscription may be considered verified (or valid) for purposes of allowing the UE to connect to the network. If, in the other hand, the reduced capability indication information is not consistent with the subscription data, the subscription may be considered not verified for purposes of allowing the UE to connect to the network. In some aspects, consistency with the subscription data may be determined based on an exact match of indicated capabilities versus subscription capabilities, or a match of some subset of the subscription capabilities.

Operations 500 then proceed to operation 514 with AMF/SEAF 502 providing a registration decision to UE 120 and causing BS 110 to complete a connection procedure (e.g., an RRC connection procedure) or to release the connection at operation 516.

In some aspects, AMF/SEAF 502 may determine that the capabilities of UE 120 do not match the subscription data, but may nevertheless allow a connection. However, in such cases, AMF/SEAF 502 may downgrade the service level or services available to UE 120, for example, to a service level preconfigured by the network for such cases. For example, the default service level may be a low tier service level with limited use restrictions.

In some aspects, when AMF/SEAF 502 determines not to allow UE 120 to connect to the network, it may send a rejection indication in, for example, registration decision 514. In some aspects, the rejection indication may include a code corresponding to a particular reason for the rejection. Upon receiving the rejection indication, UE 120 may determine the reason for not be allowed to access the network based on the rejection indication.

FIG. 5B depicts optional operations 550 that may be performed in addition to, or in some cases as an alternative to, the operations 500 in FIG. 5A. Like operations are numbered the same as in FIG. 5A and have the same meaning, whereas new operations in FIG. 5B have unique numbers.

In FIG. 5B, operations 550 begin at optional operation 552 with BS 110 broadcasting and UE 120 receiving network information, such as within a system information broadcast (SIB) message.

In some aspects, information broadcast message 552 may include information regarding whether or not reduced capability UEs are supported by BS 110. In some cases, information broadcast 552 may include information regarding whether specific categories of reduced capability UEs are supported. In some aspects, the categories may be based on specific use categories, UE capabilities, or a combination of the two. For example, information broadcast 552 may include information that BS 110 will allow connections from a wearable device (use category) having operating bandwidth of at least 20 MHz (capability category).

In alternative aspects, the network may advertise access entities and access categories specifically defined for reduced capacity UEs in a unified access control procedure, and in such aspects, information broadcast 552 may be a part of the unified access control procedure.

Operations 550 then proceed to optional operation 554 with UE 120 comparing its capabilities to those of the network.

In some aspects, UE 120 may compare its capabilities with the network based on the information broadcast message 552. In other aspects, UE 120 may compare its capabilities with the network based on an internal store of network element information. For example, UE 120 may store a list of restricted access network elements (e.g., base stations, cells, or the like) based on its capabilities and the network's configuration. In some aspects, the list of restricted access network elements may be configured by the network in UE 120 in, for example, an RRC release message or another network message. In some aspects, the list of restricted access network elements may be maintained by the capability manager 122 or 281 of FIGS. 1 and 2, respectively.

Operations 550 then proceed to operation 504, where a RACH procedure is performed as described above with respect to FIG. 5A.

Operations 550 then proceed to operation 556 where a connection establishment procedure is commenced between UE 120 and BS 110. In this aspect, UE 120 may include a UE ID and a reduced capability indication in an RRC connection establishment message. Then, BS 110 may receive and forward the UE ID and reduced capability indication to AMF/SEAF 502 in a message, such as an initial UE context message. Thus, unlike in FIG. 5A where UE 120 provides its UE ID and reduced capability indication directly to AMF/SEAF 502, in this example BS 110 acts as an intermediary for that data.

Operations 550 then proceed to operation 510 where AMF/SEAF 502 may optionally authenticate UE 120.

Operations 550 then proceed to operation 512 with verifying UE 120's reduced capability indication (provided in operation 558) against its subscription data, as described above with respect to FIG. 5A.

Operations 550 then proceed to an optional UE radio capability verification set of operations 560.

In some cases, verification of UE 120's reduced capability indication against its subscription in operation 512 does not completely prevent a hacked or misconfigured UE from reporting an incorrect indication. Or in other aspects, such as described in more detail with respect to FIG. 7, the network may not receive a reduced capability indication from UE. Therefore, in some aspects, the network may perform a further procedure to verify UE 120's radio capabilities are consistent with the capabilities included in its reduced capability indication, which may be referred to as a capability match procedure.

Operations 560 begin with operation 562 where AMF/SEAF 502 initiates an initial UE context procedure (without sending a NAS registration response) and then BS 110 performs an access stratum (AS) security establishment procedure with UE 120 at operation 564.

Operations 560 then proceed to operation 566 where AMF/SEAF 502 requests BS 110 to perform a UE capability match procedure. In some aspects, operation 566 includes sending the reduced capability indication received at operation 558 to BS 110 at operation 566.

Operations 560 then proceed to operation 568 where BS 110 optionally performs a capability enquiry procedure with UE 120 to determine UE 120's radio capabilities if they are not already available at BS 110.

Operations 560 then proceed to operation 570 where BS 110 compares UE 120's radio capabilities with the capabilities included with UE 120's reduced capability indication (as provided in operation 558).

In some aspects, OAM provisions a mapping between a list of radio capabilities and one or more categories of reduced capability UEs. The list may need to include only a subset of UE radio capabilities.

Operations 560 then proceed to operation 572 where BS 110 reports the results of capability comparison back to AMF/SEAF 502. Based on the results, AMF/SEAF 502 sends a registration decision message to UE 120 at operation 514 and then BS 110 completes the connection or releases the connection with UE 120 at operation 516.

In some aspects, AMF/SEAF 502 may determine that the capabilities of UE 120 do not match, but may nevertheless allow a connection. However, in such cases, AMF/SEAF 502 may downgrade the service level or services available to UE 120 based on the determined capabilities during operations 560.

As in FIG. 5A, when AMF/SEAF 502 determines not to allow UE 120 to connect to the network, it may send a rejection indication in registration decision 514. In some aspects, the rejection indication may include a code corresponding to a particular reason for the rejection. Upon receiving the rejection indication, UE 120 may determine the reason for not be allowed to access the network based on the rejection indication.

In some cases (not depicted in FIGS. 5A and 5B), UE 120 may not include a reduced capability indication during the connection establishing procedure, or it may otherwise not be received by AMF/SEAF 502. In such cases, operations 560 provide a way to verify UE 120's capabilities without an explicit indication.

Figure 6:
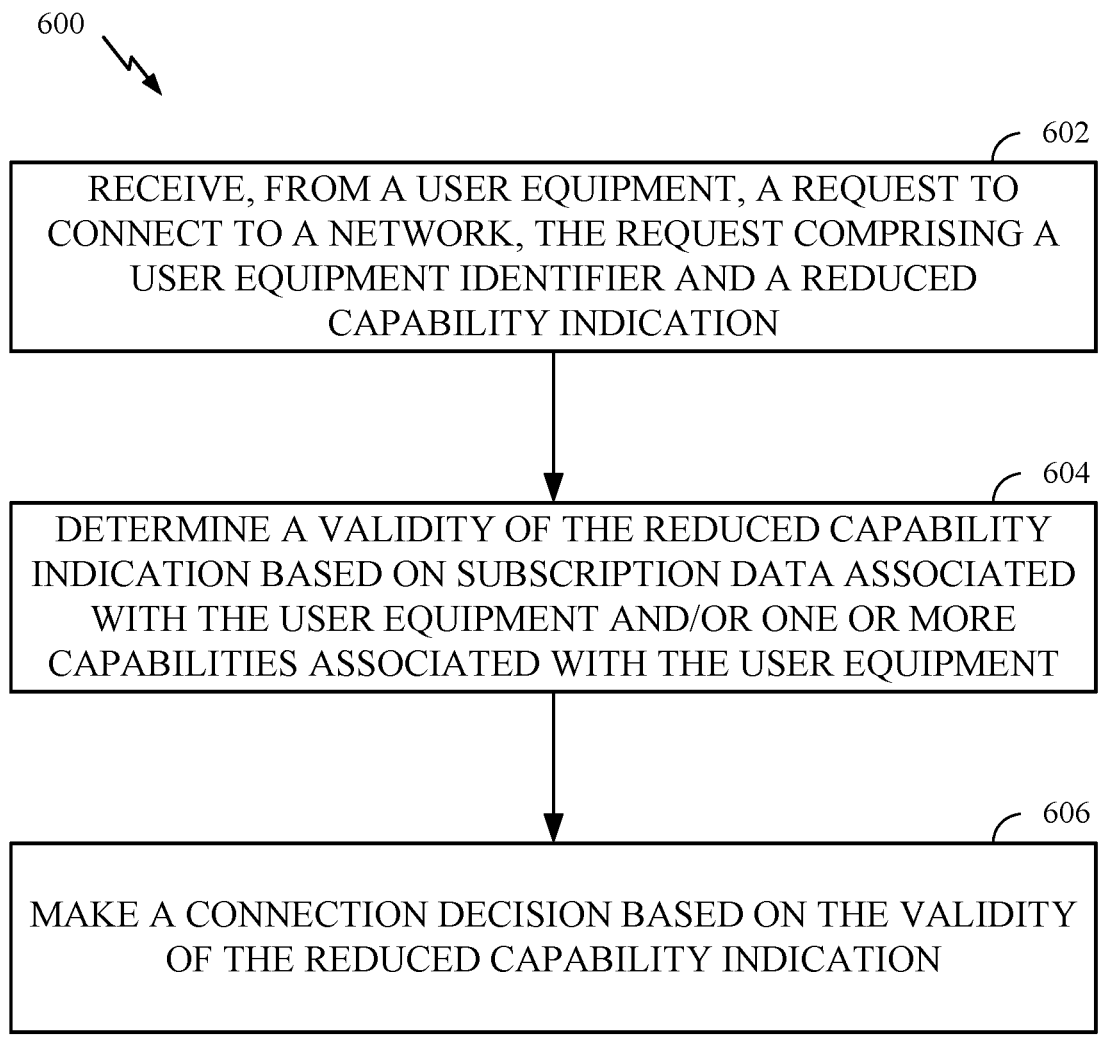
FIG. 6 depicts an example method for performing network communication.

Example Method of Controlling Access and Use of a Network Based on UE Capabilities FIG. 6 depicts an example method 600 for wireless communication by a network entity. In some aspects, method 600 is performed by a network entity, such as a base station of network 100 of FIG. 1. In some aspects, the network entity may implement a plurality of network functions, such as depicted in FIG. 4. In some aspects, method 600 may be performed consistent with aspects described with respect to FIGS. 5A and 5B.

Method 600 begins at step 602 with receiving from a user equipment a request to connect to a network, the request comprising a user equipment identifier and a reduced capability indication.

In some aspects of method 600, an access network entity, such as base station 110 in FIGS. 1 and 2, or R(AN) 404 in FIG. 4, performs the receiving from the user equipment the request to connect to the network comprising the user equipment identifier and the reduced capability indication, Method 600 then proceeds to step 604 with determining a validity of the reduced capability indication based on subscription data associated with the user equipment and/or one or more capabilities associated with the user equipment. In some aspects, the one or more capabilities comprise at least one radio capability of the user equipment.

In some aspects, an access and mobility network entity, such as AMF 406 in FIG. 4, performs the determining the validity of the reduced capability indication based on the subscription data associated with the user equipment.

Method 600 then proceeds to step 606 with making a connection decision based on the validity of the reduced capability indication.

In some aspects, an access and mobility network entity, such as AMF 406 in FIG. 4, performs the making the connection decision based on the validity of the reduced capability indication.

In some aspects of method 600, the connection decision comprises a decision to reject the request from the user equipment to connect to the network based on the reduced capability indication being inconsistent with the subscription data or the one or more capabilities associated with the user equipment, and the method further comprises transmitting a connection rejection message to the user equipment.

In some aspects of method 600, the connection rejection message comprises a code defining a reason for the connection decision.

In some aspects of method 600, the connection decision comprises a decision to accept the request from the user equipment to connect to the network based on the reduced capability indication being consistent with the subscription data associated with the user equipment, and the method further comprises transmitting a connection acceptance message to the user equipment.

In some aspects, method 600 further includes retrieving subscription data associated with the user equipment based on the user equipment identifier. In some aspects, an access and mobility network entity, such as AMF 406 in FIG. 4, performs the retrieving the subscription data associated with the user equipment based on the user equipment identifier.

In some aspects of method 600, the access and mobility network entity retrieves the subscription data from a user data management network entity, such as UDM 418 in FIG. 4.

In some aspects of method 600, the user equipment identifier and the reduced capability indication is received in a non-access stratum (NAS) registration request message.

In some aspects of method 600, the NAS registration request is received by an access and mobility network entity directly from the user equipment, such as depicted in FIG. 5A.

In some aspects of method 600, the user equipment identifier and the reduced capability indication is received in an RRC connection establishment message.

In some aspects of method 600, the RRC connection establishment message is received by an access and mobility network entity from an access network entity.

In some aspects of method 600, the reduced capability indication comprises one or more UE radio capabilities.

In some aspects, method 600 further includes: initiating a capability match procedure with the user equipment; determining one or more capabilities of the user equipment based on the capability match procedure; and comparing the one or more capabilities to the reduced capability indication to determine an outcome of the capability match procedure, wherein the connection decision is further based on the outcome of the capability match procedure. In some aspects, the one or more capabilities are radio capabilities of the user equipment.

In some aspects of method 600, an access and mobility network entity performs the initiating the capability match procedure with the user equipment by sending a request for the capability match procedure to an access network entity including the reduced capability indication, and the access network entity performs the determining the one or more capabilities of the user equipment based on the capability match procedure.

In some aspects, method 600 further includes broadcasting a system information broadcast (SIB) message comprising an indication that the network supports reduced capacity user equipment.

Notably, method 600 is just one example, and other examples with further or alternative steps for performing the various functions described herein are possible.

Figure 7:
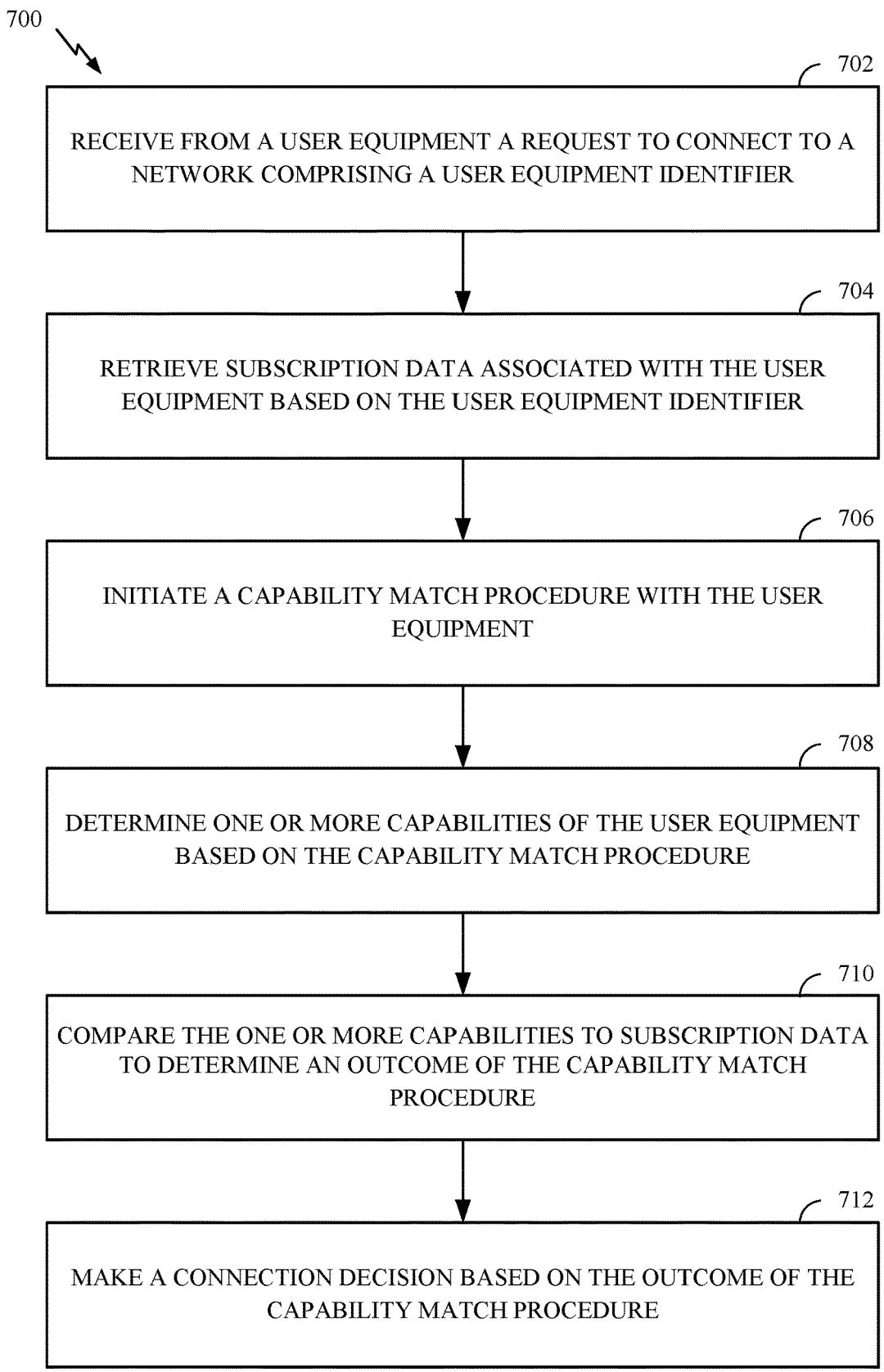
FIG. 7 depicts another example method for performing network communication.

FIG. 7 depicts another method 700 for performing network communication. In some aspects, method 700 is performed by a network, such as network 100 of FIG. 1. In some aspects, the network may include a plurality of network functions, such as depicted in FIG. 4.

Method 700 begins at step 702 with receiving from a user equipment a request to connect to a network, wherein the request comprises a user equipment identifier.

Method 700 then proceeds to step 704 with retrieving subscription data associated with the user equipment based on the user equipment identifier.

Method 700 then proceeds to step 706 with initiating a capability match procedure with the user equipment. In one aspect, the capability match procedure is as described above with respect to operations 560 in FIG. 5B.

Method 700 then proceeds to step 708 with determining one or more capabilities of the user equipment based on the capability match procedure. In some aspects, the one or more capabilities are radio capabilities of the user equipment.

Method 700 then proceeds to step 710 with comparing the one or more capabilities to subscription data to determine an outcome of the capability match procedure.

Method 700 then proceeds to step 712 with making a connection decision based on the outcome of the capability match procedure.

In some aspects of method 700, the connection decision comprises a decision to reject the request from the user equipment to connect to the network based on the determined one or more capabilities being inconsistent with the subscription data associated with the user equipment, and the method further comprises transmitting a connection rejection message to the user equipment. In some aspects, the connection rejection message comprises a code defining a reason for the connection decision.

In some aspects of method 700, the connection decision comprises a decision to accept the request from the user equipment to connect to the network based on the determined one or more capabilities being consistent with the subscription data associated with the user equipment, and the method further comprises: transmitting a connection acceptance message to the user equipment.

In some aspects of method 700, an access network entity, such as base station 110 in FIGS. 1 and 2, or R(AN) 404 in FIG. 4, performs the receiving from the user equipment the request to connect to the network comprising the user equipment identifier, and an access and mobility network entity, such as AMF 406 in FIG. 4, performs: the retrieving the subscription data associated with the user equipment based on the user equipment identifier; initiating a capability match procedure with the user equipment; and the making the connection decision based on the validity of the reduced capability indication.

In some aspects of method 700, the access and mobility network entity retrieves the subscription data from a user data management network entity.

Some aspects of method 700 further include broadcasting a system information broadcast (SIB) message comprising an indication that the network supports reduced capacity user equipment.

Notably, method 700 is just one example, and other examples with further or alternative steps for performing the various functions described herein are possible.

Figure 8:
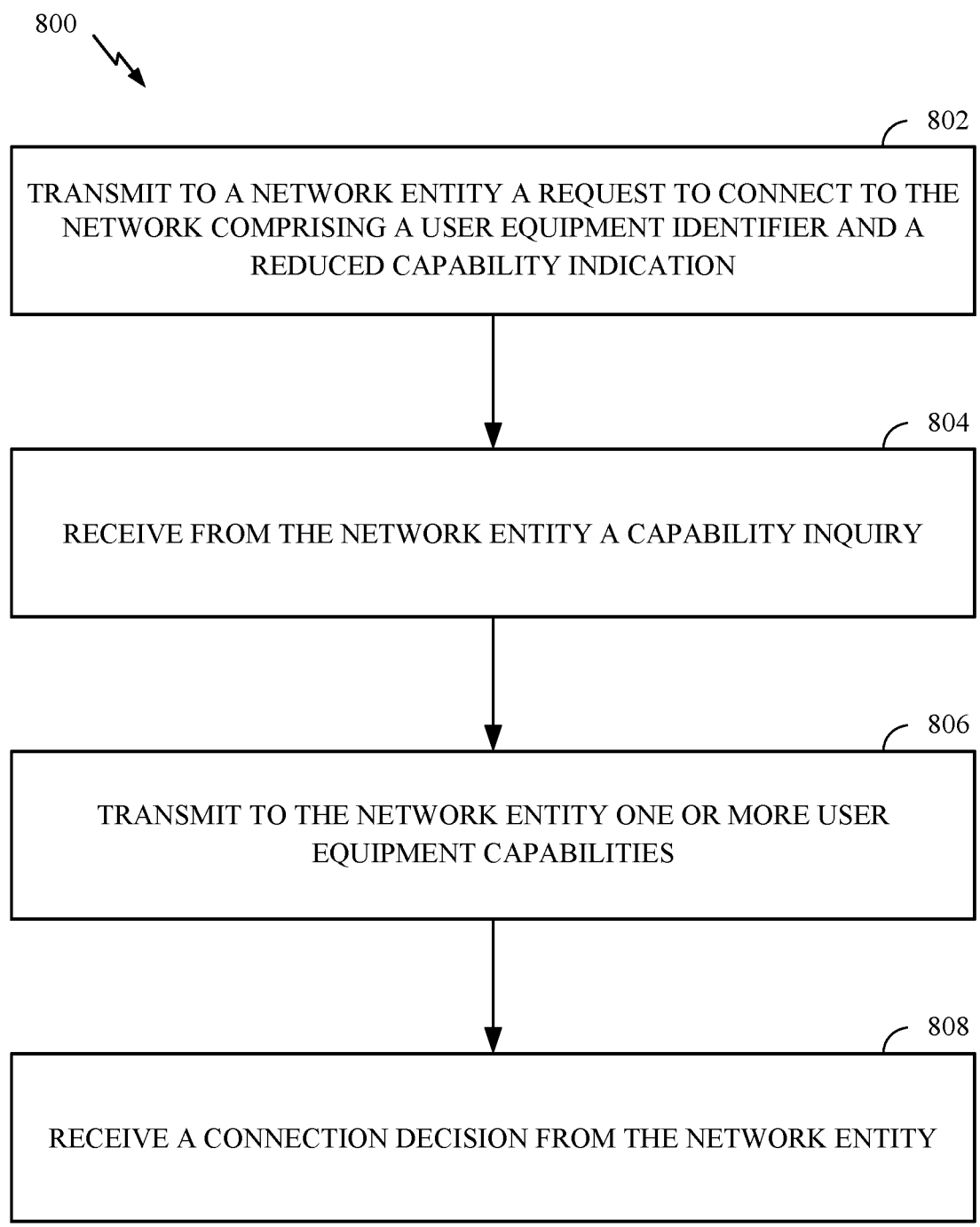
FIG. 8 depicts another example method for performing network communication.

FIG. 8 depicts an example method 800 for performing network communications. In some aspects, method 800 may be performed by a UE, such as UE 120 of FIGS. 1 and 2.

Method 800 begins at step 802 with transmitting to a network entity a request to connect to the network comprising a user equipment identifier and a reduced capability indication.

Method 800 then proceeds to step 804 with receiving from the network entity a capability inquiry.

Method 800 then proceeds to step 806 with transmitting to the network entity one or more user equipment capabilities.

Method 800 then proceeds to step 808 with receiving a connection decision message from the network entity.

In some aspects, the connection decision may be a connection acceptance decision. In other aspects, the connection decision may be a connection rejection decision. In such aspects, the connection decision may comprise a rejection indication, such as a code or other data, which indicates a reason for the rejection, such as capabilities that do not match the user equipment's subscription.

Some aspects of method 800 further include receiving a system information broadcast (SIB) message from the network entity comprising an indication that the network entity supports reduced capacity user equipment.

Some aspects of method 800 further include receiving a list of network entities that do not support reduced capacity user equipment, wherein the network entity is not on the list.

Notably, method 800 is just one example, and other examples with further or alternative steps for performing the various functions described herein are possible.

Example Communication Devices

Figure 9:
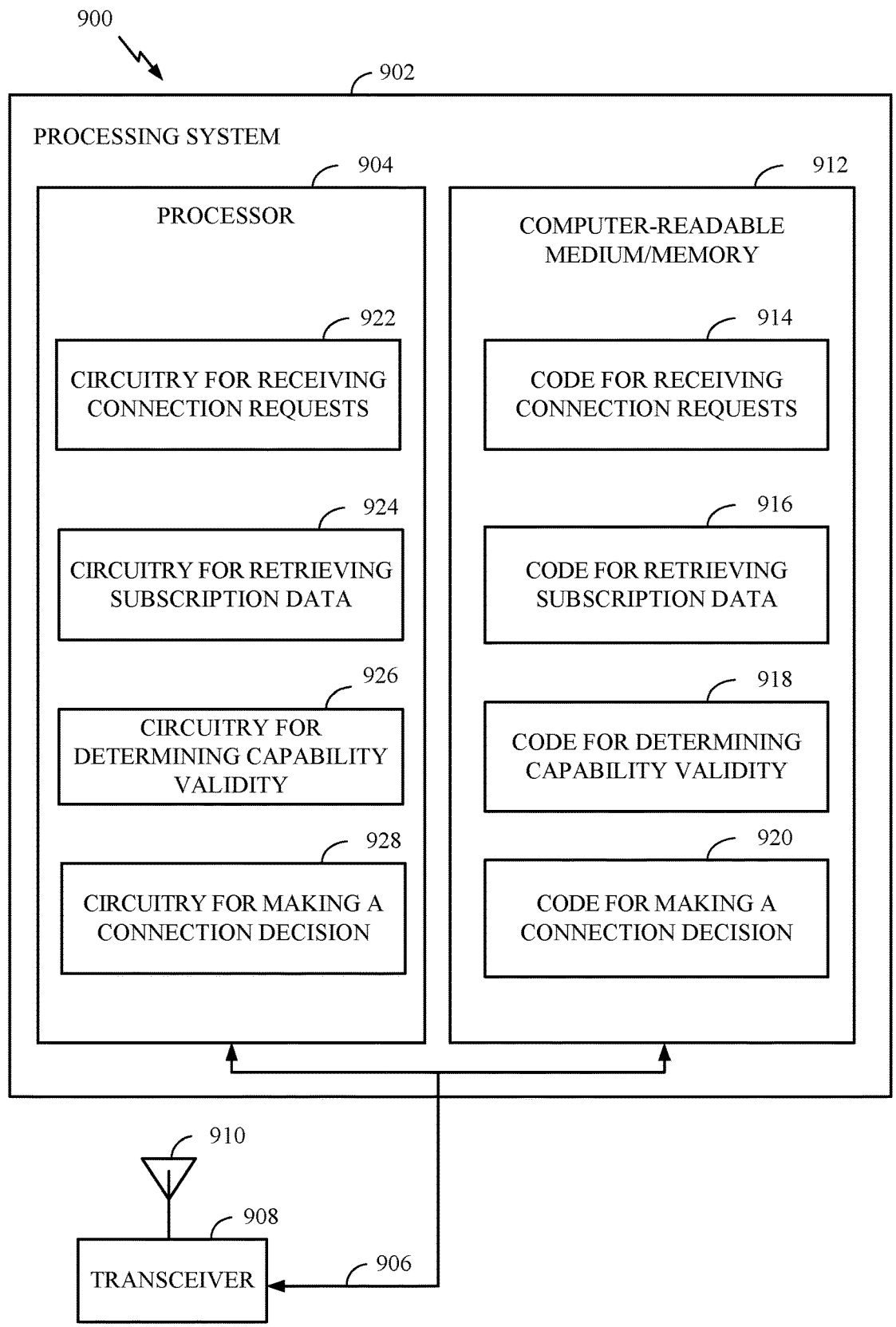
FIG. 9 depicts an example communications device that includes various components configured to perform operations for the techniques disclosed herein.

FIG. 9 depicts an example communications device 900 that may include various components (e.g., corresponding to means-plus-function components) configured to perform operations for the techniques disclosed herein, such as the operations illustrated in FIGS. 6 and 7. In some aspects, communication device 900 is a network entity, such as base station 110 in FIGS. 1 and 2.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 6 and 7, or other operations for performing the various techniques discussed herein for controlling access and use of a network's services for user equipment of varying capability.

In certain aspects, computer-readable medium/memory 912 stores code 914 for receiving at a network from a user equipment a request to connect to the network, the request comprising a user equipment identifier and a reduced capability indication; code 916 for retrieving subscription data associated with the user equipment based on the user equipment identifier; code 918 for determining a validity of the reduced capability indication based on the subscription data and/or one or more capabilities associated with the user equipment; and code 920 for making a connection decision based on the validity of the reduced capability indication.

In certain aspects, the processor 904 has circuitry configured to implement the code stored in the computer-readable medium/memory 912, including: circuitry 922 for receiving at a network from a user equipment a request to connect to the network, the request comprising a user equipment identifier and a reduced capability indication; circuitry 924 for retrieving subscription data associated with the user equipment based on the user equipment identifier, circuitry 926 for determining a validity of the reduced capability indication based on the subscription data and/or one or more capabilities associated with the user equipment; and circuitry 928 for making a connection decision based on the validity of the reduced capability indication.

Notably, FIG. 9 is just one example, and other examples with further circuitry and further code configured to perform the various functions described herein are possible.

Figure 10:
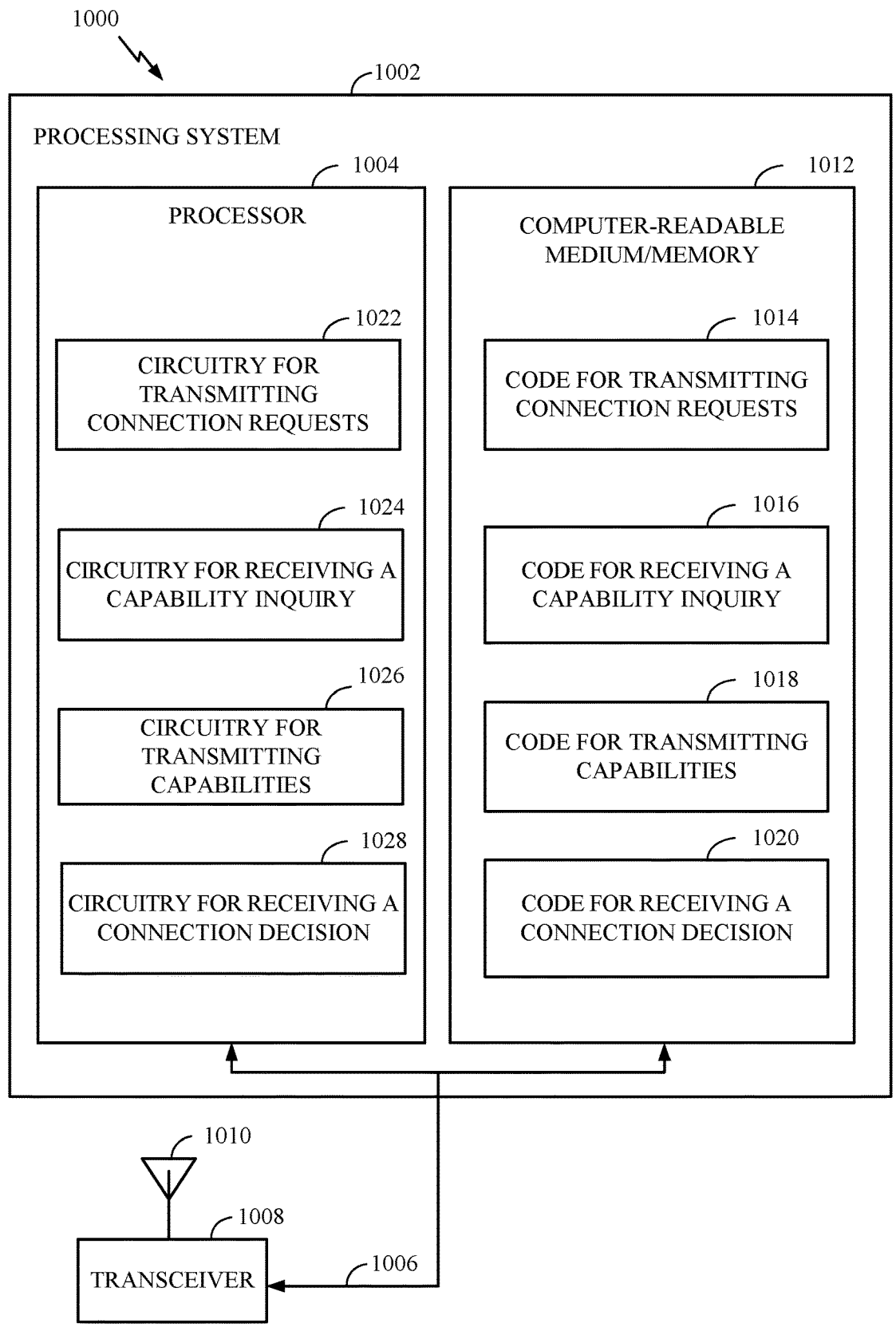
FIG. 10 depicts another example communications device that includes various components configured to perform operations for the techniques disclosed herein.

FIG. 10 depicts another example communications device 1000 that may include various components (e.g., corresponding to means-plus-function components) configured to perform operations for the techniques disclosed herein, such as the operations illustrated in FIG. 8. In some aspects, communication device 900 is a user equipment, such as UE 120 in FIGS. 1 and 2.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for controlling access and use of a network's services for user equipment of varying capability.

In certain aspects, computer-readable medium/memory 1012 stores code 1014 for transmitting to a network entity a request to connect to the network comprising a user equipment identifier and a reduced capability indication; code 1016 for receiving from the network entity a capability inquiry; code 1018 for transmitting to the network entity one or more user equipment capabilities; and code 1020 for receiving a connection decision from the network entity.

In certain aspects, the processor 1004 has circuitry configured to implement the code stored in the computer-readable medium/memory 1012, including: circuitry 1022 for transmitting to a network entity a request to connect to the network comprising a user equipment identifier and a reduced capability indication; circuitry 1024 for receiving from the network entity a capability inquiry; circuitry 1026 for transmitting to the network entity one or more user equipment capabilities; and circuitry 1028 for receiving a connection decision from the network entity.

Notably, FIG. 10 is just one example, and other examples with further circuitry and further code configured to perform the various functions described herein are possible.

Example Clauses

Implementation examples are described in the following numbered clauses:

Clause 1: A method for wireless communication by a network entity, includes: receiving, from a user equipment, a request to connect to a network, the request comprising a user equipment identifier and a reduced capability indication; determining a validity of the reduced capability indication based on at least one of: subscription data associated with the user equipment; or one or more capabilities associated with the user equipment; and making a connection decision based on the validity of the reduced capability indication.

Clause 2: The method of Clause 1, wherein: the connection decision comprises a decision to reject the request from the user equipment to connect to the network based on the reduced capability indication being inconsistent with the subscription data or the one or more capabilities associated with the user equipment, and the method further comprises: transmitting a connection rejection message to the user equipment.

Clause 3: The method of Clause 2, wherein the connection rejection message comprises a code defining a reason for the connection decision.

Clause 4: The method of any one of Clauses 1-3, wherein: the connection decision comprises a decision to accept the request from the user equipment to connect to the network based on the reduced capability indication being consistent with the subscription data associated with the user equipment, and the method further comprises: transmitting a connection acceptance message to the user equipment.

Clause 5: The method of any one of Clauses 1-4, further comprising retrieving subscription data associated with the user equipment based on the user equipment identifier.

Clause 6: The method of Clause 1, wherein determining the validity of the reduced capability indication is based on the subscription data and comprises comparing capabilities defined in the subscription data associated with the user equipment with one or more capabilities associated with the received reduced capability indication.

Clause 7: The method of any one of Clauses 1-6, wherein receiving at the network from the user equipment the request to connect to the network, the request comprising the user equipment identifier and the reduced capability indication, comprises receiving the user equipment identifier and the reduced capability indication in a non-access stratum (NAS) registration request message.

Clause 8: The method of Clause 7, wherein receiving at the network from the user equipment the request to connect to the network, the request comprising the user equipment identifier and the reduced capability indication, comprises receiving the NAS registration request at an access and mobility network entity directly from the user equipment.

Clause 9: The method of any one of Clauses 1-8, wherein receiving at the network from the user equipment the request to connect to the network, the request comprising the user equipment identifier and the reduced capability indication, comprises receiving the user equipment identifier and the reduced capability indication in a radio resource control (RRC) connection establishment message.

Clause 10: The method of Clause 9, wherein receiving at the network from the user equipment the request to connect to the network, the request comprising the user equipment identifier and the reduced capability indication, comprises receiving the RRC connection establishment message at an access and mobility network entity from an access network entity.

Clause 11: The method of any one of Clauses 1-10, wherein the reduced capability indication comprises the one or radio capabilities.

Clause 12: The method of any one of Clauses 1-11, further comprising: initiating a capability match procedure with the user equipment; determining the one or more capabilities of the user equipment based on the capability match procedure; and comparing the one or more capabilities to the reduced capability indication to determine an outcome of the capability match procedure, wherein the connection decision is further based on the outcome of the capability match procedure.

Clause 13: The method of claim 12, the one or more capabilities of the user equipment comprise at least one radio capability of the user equipment.

Clause 14: The method of any one of Clauses 1-15, further comprising broadcasting a system information broadcast (SIB) message comprising an indication that the network supports reduced capacity user equipment.

Clause 15: A method for wireless communication by a network entity, comprising: receiving from a user equipment a request to connect to a network, wherein the request comprises a user equipment identifier; retrieving subscription data associated with the user equipment based on the user equipment identifier; initiating a capability match procedure with the user equipment; determining one or more capabilities of the user equipment based on the capability match procedure; comparing the one or more capabilities to subscription data to determine an outcome of the capability match procedure; and making a connection decision based on the outcome of the capability match procedure.

Clause 16: The method of Clause 15, wherein: the connection decision comprises a decision to reject the request from the user equipment to connect to the network based on the determined one or more capabilities being inconsistent with the subscription data associated with the user equipment, and the method further comprises: transmitting a connection rejection message to the user equipment.

Clause 17: The method of Clause 16, wherein the connection rejection message comprises a code defining a reason for the connection decision.

Clause 18: The method of any one of Clauses 15-17, wherein: the connection decision comprises a decision to accept the request from the user equipment to connect to the network based on the determined one or more capabilities being consistent with the subscription data associated with the user equipment, and the method further comprises: transmitting a connection acceptance message to the user equipment.

Clause 19: The method of any one of Clauses 15-18, wherein: an access network entity performs the receiving from the user equipment the request to connect to the network comprising the user equipment identifier, and an access and mobility network entity performs: the retrieving the subscription data associated with the user equipment based on the user equipment identifier; initiating a capability match procedure with the user equipment; and the making the connection decision based on the outcome of the capability match procedure.

Clause 20: The method of Clause 19, wherein the access and mobility network entity retrieves the subscription data from a user data management network entity.

Clause 21: The method of any one of Clauses 15-20, further comprising broadcasting a system information broadcast (SIB) message comprising an indication that the network supports reduced capacity user equipment.

Clause 22: A method for performing wireless communications, comprising: transmitting to a network entity a request to connect to the network comprising a user equipment identifier and a reduced capability indication; receiving from the network entity a capability inquiry; transmitting to the network entity one or more user equipment capabilities; and receiving a connection decision from the network entity.

Clause 23: The method of Clause 22, further comprising receiving a system information broadcast (SIB) message from the network entity comprising an indication that the network entity supports reduced capacity user equipment.

Clause 24: The method of any one of Clauses 22-23, further comprising: receiving a list of network entities that do not support reduced capacity user equipment, wherein the network entity is not on the list.

Clause 25: A processing system, comprising: a memory comprising computer-executable instructions; one or more processors configured to execute the computer-executable instructions and cause the processing system to perform a method in accordance with any one of Clauses 1-24.

Clause 26: A processing system, comprising means for performing a method in accordance with any one of Clauses 1-24.

Clause 27: A non-transitory computer-readable medium comprising computer-executable instructions that, when executed by one or more processors of a processing system, cause the processing system to perform a method in accordance with any one of Clauses 1-24.

Clause 28: A computer program product embodied on a computer-readable storage medium comprising code for performing a method in accordance with any one of Clauses 1-24.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5A, 5B, 6, 7, and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication at a network entity, comprising:
   receiving, from a user equipment, a request to connect to a network, the request comprising a user equipment identifier and a reduced capability indication;
   determining a validity of the reduced capability indication based on at least one of:
      subscription data associated with the user equipment; or
      one or more capabilities associated with the user equipment; and
   making a connection decision based on the validity of the reduced capability indication, wherein the connection decision comprises a decision to reject the request from the user equipment to connect to the network when the reduced capability indication is inconsistent with the subscription data or the one or more capabilities associated with the user equipment; and
   transmitting a connection rejection message to the user equipment when the connection decision comprises the decision to reject the request from the user equipment to connect to the network.

2. The method of claim 1, wherein the connection rejection message comprises a code defining a reason for the connection decision.

3. The method of claim 1, wherein:
   the connection decision comprises a decision to accept the request from the user equipment to connect to the network when the reduced capability indication is consistent with the subscription data associated with the user equipment, and
   the method further comprises transmitting a connection acceptance message to the user equipment when the connection decision comprises the decision to accept the request from the user equipment to connect to the network.

4. The method of claim 1, further comprising retrieving subscription data associated with the user equipment based on the user equipment identifier.

5. The method of claim 1, wherein determining the validity of the reduced capability indication is based on the subscription data and comprises comparing capabilities defined in the subscription data associated with the user equipment with one or more capabilities associated with the received reduced capability indication.

6. The method of claim 1, wherein receiving at the network from the user equipment the request to connect to the network, the request comprising the user equipment identifier and the reduced capability indication, comprises receiving the user equipment identifier and the reduced capability indication in a non-access stratum (NAS) registration request message.

7. The method of claim 6, wherein receiving at the network from the user equipment the request to connect to the network, the request comprising the user equipment identifier and the reduced capability indication, comprises receiving the NAS registration request at an access and mobility network entity directly from the user equipment.

8. The method of claim 1, wherein receiving at the network from the user equipment the request to connect to the network, the request comprising the user equipment identifier and the reduced capability indication, comprises receiving the user equipment identifier and the reduced capability indication in a radio resource control (RRC) connection establishment message.

9. The method of claim 8, wherein receiving at the network from the user equipment the request to connect to the network, the request comprising the user equipment identifier and the reduced capability indication, comprises receiving the RRC connection establishment message at an access and mobility network entity from an access network entity.

10. The method of claim 1, wherein the reduced capability indication comprises the one or more capabilities.

11. The method of claim 1, further comprising:
   initiating a capability match procedure with the user equipment;
   determining the one or more capabilities of the user equipment based on the capability match procedure; and
   comparing the one or more capabilities to the reduced capability indication to determine an outcome of the capability match procedure, wherein the connection decision is further based on the outcome of the capability match procedure.

12. The method of claim 11, wherein the one or more capabilities of the user equipment comprise at least one radio capability of the user equipment.

13. The method of claim 1, further comprising broadcasting a system information broadcast (SIB) message comprising an indication that the network supports reduced capacity user equipment.

14. An apparatus of wireless communication at a network entity, comprising:
one or more processors, individually or collectively, configured to execute instructions stored on one or more memories and to cause the network entity to:
receive, from a user equipment, a request to connect to a network, the request comprising a user equipment identifier and a reduced capability indication;
determine a validity of the reduced capability indication based on at least one of:
subscription data associated with the user equipment; or
one or more capabilities associated with the user equipment; and
make a connection decision based on the validity of the reduced capability indication, wherein the connection decision comprises a decision to reject the request from the user equipment to connect to the network when the reduced capability indication is inconsistent with the subscription data or the one or more capabilities associated with the user equipment; and
transmit a connection rejection message to the user equipment when the connection decision comprises the decision to reject the request from the user equipment to connect to the network.

15. The network entity of claim 14, wherein the connection rejection message comprises a code defining a reason for the connection decision.

16. The network entity of claim 14, wherein:
the connection decision comprises a decision to accept the request from the user equipment to connect to the network when the reduced capability indication is consistent with the subscription data associated with the user equipment, and
the one or more processors are further configured to cause the network entity to transmit a connection acceptance message to the user equipment when the connection decision comprises the decision to accept the request from the user equipment to connect to the network.

17. The network entity of claim 14, wherein the one or more processors are further configured to cause the network entity retrieve subscription data associated with the user equipment based on the user equipment identifier.

18. The network entity of claim 14, wherein, in order to determine the validity of the reduced capability indication based on the subscription data, the one or more processors are further configured to cause the network entity to compare capabilities defined in the subscription data associated with the user equipment with one or more capabilities associated with the received reduced capability indication.

19. The network entity of claim 14, wherein, in order to receive at the network from the user equipment the request to connect to the network, the request comprising the user equipment identifier and the reduced capability indication, the one or more processors are further configured to cause the network entity to receive the user equipment identifier and the reduced capability indication in a non-access stratum (NAS) registration request message.

20. The network entity of claim 19, wherein, in order to receive at the network from the user equipment the request to connect to the network, the request comprising the user equipment identifier and the reduced capability indication, the one or more processors are further configured to cause the network entity to receive the NAS registration request at an access and mobility network entity directly from the user equipment.

21. The network entity of claim 14, wherein, in order to receive at the network from the user equipment the request to connect to the network, the request comprising the user equipment identifier and the reduced capability indication, the one or more processors are further configured to cause the network entity to receive the user equipment identifier and the reduced capability indication in a radio resource control (RRC) connection establishment message.

22. The network entity of claim 21, wherein, in order to receive at the network from the user equipment the request to connect to the network, the request comprising the user equipment identifier and the reduced capability indication, the one or more processors are further configured to cause the network entity to receive the RRC connection establishment message at an access and mobility network entity from an access network entity.

23. The network entity of claim 14, wherein the reduced capability indication comprises the one or more capabilities.

24. The network entity of claim 14, wherein:
the one or more processors are further configured to cause the network entity to:
initiate a capability match procedure with the user equipment;
determine the one or more capabilities of the user equipment based on the capability match procedure; and
compare the one or more capabilities to the reduced capability indication to determine an outcome of the capability match procedure, and
the connection decision is further based on the outcome of the capability match procedure.

25. The network entity of claim 24, wherein the one or more capabilities of the user equipment comprise at least one radio capability of the user equipment.

26. The network entity of claim 14, wherein the one or more processors are further configured to cause the network entity to broadcast a system information broadcast (SIB) message comprising an indication that the network supports reduced capacity user equipment.

27. A non-transitory computer-readable medium for wireless communication at a network entity, comprising:
instructions that, when executed by one or more processors of the network entity, cause the network entity to:
receive, from a user equipment, a request to connect to a network, the request comprising a user equipment identifier and a reduced capability indication;
determine a validity of the reduced capability indication based on at least one of:
subscription data associated with the user equipment; or
one or more capabilities associated with the user equipment; and
make a connection decision based on the validity of the reduced capability indication, wherein the connection decision comprises a decision to reject the request from the user equipment to connect to the network when the reduced capability indication is inconsistent with the subscription data or the one or more capabilities associated with the user equipment; and transmit a connection rejection message to the user equipment when the connection decision comprises the decision to reject the request from the user equipment to connect to the network.

28. An apparatus for wireless communication at a network entity, comprising:
- means for receiving, from a user equipment, a request to connect to a network, the request comprising a user equipment identifier and a reduced capability indication;
- means for determining a validity of the reduced capability indication based on at least one of:
  - subscription data associated with the user equipment; or
  - one or more capabilities associated with the user equipment;
- means for making a connection decision based on the validity of the reduced capability indication, wherein the connection decision comprises a decision to reject the request from the user equipment to connect to the network when the reduced capability indication is inconsistent with the subscription data or the one or more capabilities associated with the user equipment; and
- means for transmitting a connection rejection message to the user equipment when the connection decision comprises the decision to reject the request from the user equipment to connect to the network.

* * * * *